May 17, 1932.　　　C. PEARSON　　　1,859,157
MOWING MACHINE
Filed Oct. 20, 1930　　　2 Sheets-Sheet 1
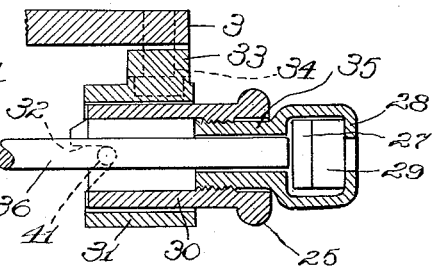
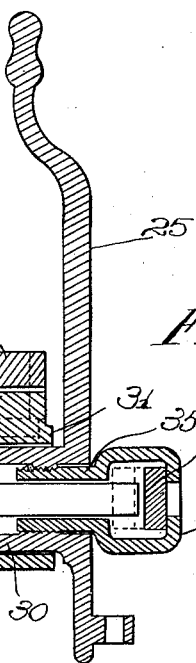
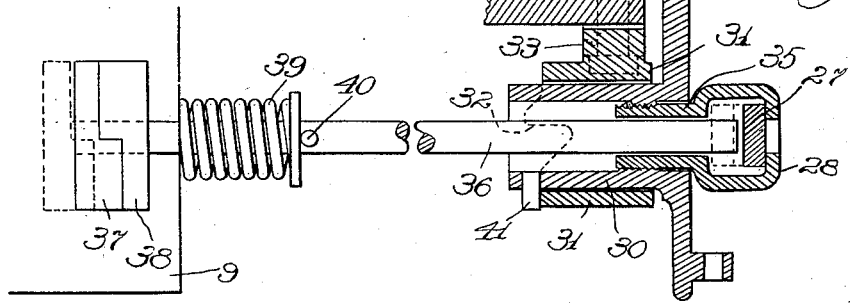
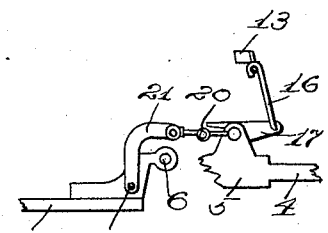
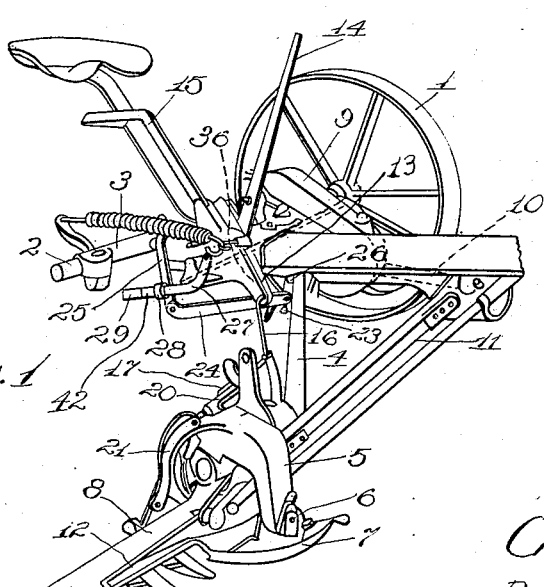
Inventor
Charles Pearson
By H. P. Loomis
Atty.

May 17, 1932.  C. PEARSON  1,859,157
MOWING MACHINE
Filed Oct. 20, 1930  2 Sheets-Sheet 2
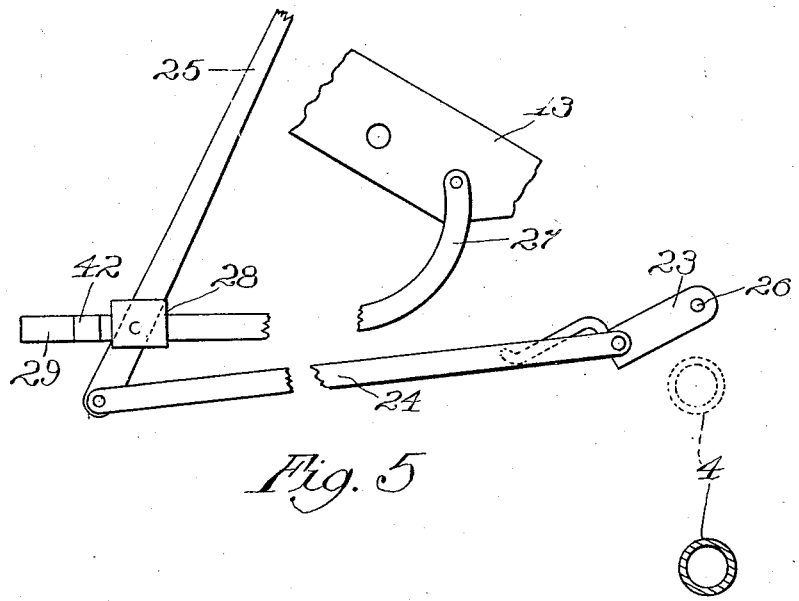
Fig. 5
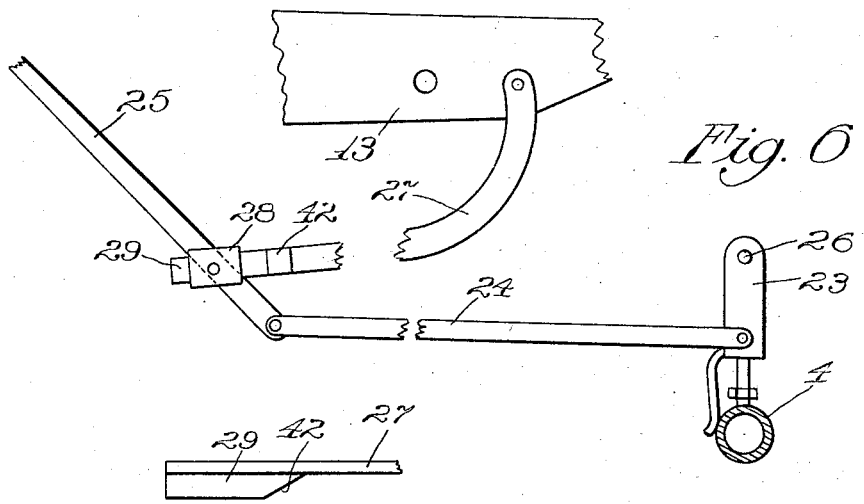
Fig. 6
Fig. 7
Inventor.
Charles Pearson
By ...
Atty.

Patented May 17, 1932

1,859,157

UNITED STATES PATENT OFFICE

CHARLES PEARSON, OF CICERO, ILLINOIS, ASSIGNOR TO INTERNATIONAL HARVESTER COMPANY, A CORPORATION OF NEW JERSEY

MOWING MACHINE

Application filed October 20, 1930, Serial No. 489,815, and in Germany June 30, 1930.

This invention relates to mowing machines of the type having a reciprocating cutting mechanism comprising a cutter bar which is in pivotal connection with a coupling arm pivoted to the main frame.

In such mowers it is usual to provide means to enable the cutter bar to be adjusted to an approximately horizontally raised position, that is to the so-called plain lift position, and also to a vertical position, such means usually comprising a system of links and levers. It is advantageous that the bar can be raised to a relatively high plain lift or horizontal position to enable it to clear swaths of cut grass and the like and moreover to permit this high lift, the coupling arm rises with the bar. When, however, it is desired to adjust the bar vertically, the rising of the coupling arm must be prevented in order to allow the bar to fold about the pivotal connection between the bar and the coupling arm, and it has been proposed to arrange a lever operated stop on the mower frame which could be inserted at will in the path of the coupling arm to prevent it from rising when it was desired to lift the bar vertically. When the bar is adjusted to its plain lift position, it is advantageous to allow the knife to continue to run, so clearing the bar of cut grass and trash, but when the bar is vertically adjusted, the knife must be disconnected from its driving mechanism and since, when working in confined spaces, the operator may require to raise the bar vertically at fairly frequent intervals, it is desirable to arrange that the disconnection of the knife from the driving means occurs automatically before the vertical movement of the bar takes place.

It is the object of the present invention to provide on a mower of the kind described means to automatically disconnect the knife from its driving mechanism when the levers are moved for lifting the cutter bar to the vertical position with the stop in the path of the coupling arm, said means not operating to effect the disconnection of the knife when the levers are moved for the plain lift position of the bar.

The invention will be understood with reference to the following drawings which illustrate a preferred method of execution and in which:

Figure 1 shows a perspective view of a mower with certain parts removed;

Figure 2 shows certain details of the parts shown in Figure 1;

Figure 3 shows a cross section of the lever for inserting the stop in the path of the coupling arm and the associated parts to be described later, the lever and parts being shown in the position for the vertical lift of the cutter bar.

Figure 4 shows a corresponding view of certain parts of Figure 3 when the lever is in the position for the plain or horizontal lift;

Figure 5 shows a side view of the stop operating lever in position for the plain lift adjustment;

Figure 6 shows a corresponding view of the lever with the stop in position for the vertical lift adjustment of the bar; and, Figure 7 shows a detail of a part shown in Figures 5 and 6.

Referring to Figure 1 the mower comprises a pair of ground wheels of which only one is indicated at 1, and these wheels support an axle 2 which is enclosed in a casting 3 forming a part of the main frame of the mower. The under side of the main frame 3 carries a bracket (not shown) wherein is pivotally mounted a forwardly and diagonally extending coupling arm 4, to the forward end of which is rockably connected a coupling yoke 5. Upon this yoke is pivoted at 6 a shoe 7, this shoe having rigidly attached to it a laterally extending cutter bar 8. The gear housing 9 encloses the usual gears for transmitting the movement of the road wheels to the shaft 10 on the end of which is an eccentric for oscillating the pitman 11, which drives the knife 12.

In order to adjust the cutter bar to the plain lift position or to its maximum or vertical position, control means are provided comprising a lifting arm 13 which is pivoted on the main frame and on which is mounted a hand lever 14 and a co-operating foot lever 15. The forward end of the arm 13 is connected to a link 16 which is in turn connected to an arm 17 of which one end is pivoted in the coupling yoke 5 and the opposite end is connected by links 20 to a pull link 21, which latter link is pivoted at 22 to the rear of shoe 7.

When the hand lever 14 or the foot lever 15 are moved to swing the lifting arm 13 upwards, the link 16 which is connected to the arm 17 will raise the coupling arm 4 and the yoke 5, this operation raising the cutter bar to the plain or horizontal lift position. Since the arm 4 and yoke 5 move together, the bar may be raised to a relatively high position to clear cut swaths of grass and small obstructions. In Figure 5 the arm 4 is indicated in full lines in its normal or working position and in dotted lines in the position it may assume when adjusted for the plain lift position.

If it be desired to elevate the cutter bar to a vertical position it is necessary to arrest the coupling arm 5 at a certain position, so that the pull link 21 can be brought into operation to pull the cutter bar 8 to the position mentioned. There is accordingly provided a stop 23 pivotally carried on arm 24 operable by a lever 25 to insert the stop in the path of the arm 4 or to remove it away from the arm as indicated in Figures 5 and 6. The upper end of the stop 23 is pivoted at 26 at a convenient point on the mower frame so that the movement of the arm 24 will cause the stop either to lie horizontally out of the way of the arm 4 as indicated in Figure 5 or to stand vertically in the path of the arm 4 as indicated in Figure 6. It will be understood that when the stop 23 is in the position indicated in Figure 6, the bar 4 may be raised by the levers 14, 15 only until the bar encounters the stop whereon continued movement of the levers will pull on the link 21 to cause the cutter bar 8 to assume the vertical position.

Pivotally connected to the lifting arm 13 is a lever arm 27 which is bent as shown in Figures 1, 5 and 6 and of which the free end is carried in a sleeve 28 screwed or otherwise secured to the lever 25. As indicated in Figure 7, the lever arm 27 terminates in a thickened part 29 having a bevel or cam edge 42. The thickened part 29 is of such cross sectional dimensions as to just fit inside the sleeve 28. On the inner side of the lever 25 and integral therewith is an annular sleeved extension 30 which is carried in a bearing 31, having a lateral cam part 32 as shown in Figures 3 and 4. On the inner end of the sleeved extension 30 is a pin 41 adapted to ride on the cam track 32 on the bearing 31, so as to cause the sleeve 30, lever 25, and the sleeve 28 to slide relative to the bearing 31. The bearing 31 is secured to the main frame in any convenient manner. In Figure 3 for example, the bearing is shown having a bracket 33 apertured to receive a bolt 34 to secure the bracket to the frame part 3. The sleeve 28 has a lateral extension 35 by which the sleeve may be secured to the lever 25 and which is apertured to form a bearing for the shaft 36. The shaft 36 extends into the gear box 9 to a laterally movable clutch face 37 which co-operates with the opposite clutch face 38. As will be understood the clutch part 38 is rotated by gears (not shown) driven by the rotation of the road wheels, while the co-operating clutch part 37 is connected to transmission gears (also not shown) to drive the shaft 10 for oscillating the pitman 11 and consequently the knife 12.

The spring 39 bears against a pin 40 on the shaft 36 so tending to keep the clutch faces 37 and 38 normally in contact in order that the rotation of the road wheels is transmitted to the gears driving the pitman 11 and the knife.

The operation of the device will now be briefly described:

Referring first to Figures 4 and 5 which show the disposition of the parts for the movement of the bar to the plain lift position, it will be seen (Figure 4) that the lever 25 is in the position to move the stop 23 out of the path of the coupling arm 4 so allowing the arm to rise to the position indicated by the dotted lines. In this position of the lever, moreover, the pin 41 (see Figure 4) is in the hollow part of the cam, so that the sleeve 30 and the lever 25 and sleeve 28 connected therewith are disposed so that the inner edge of the sleeve 28 is in alignment with the end of the shaft 36. Now when the hand or foot levers 14, 15 are operated to raise the cutter bar, the arm 13 is rocked upwardly, so causing the lever arm 27 to slide in the sleeve 32 until the thickened end 29 enters therein. Since the end of the shaft 36 is within the limits of the sleeve extension 35, the movement of the part 29 in the sleeve has no effect on the shaft 36 and the clutch faces 37, 38 remain in contact to allow the knife to continue to oscillate as will be understood.

Referring now to Figures 3 and 6 which show the disposition of the parts for the movement of the bar to the vertical lift position, it will be seen (Figure 6) that the lever 25 is in position to move the stop 23 in the path of the bar 4. In this position of the lever the pin 41 moves to the high part of the cam so causing the sleeve 30, lever 25 and the sleeve 28 to slide relative to the bearing 31, so that a portion of the end of the shaft 36 is within the sleeve 28 as indicated in full lines in Figure 3. It will be understood that with the parts in this position the shaft 36 has not been moved, and consequently the clutch parts 37 and 38 remain in engagement. Now when the hand or foot levers are operated to raise the cutter bar, the end of arm 13 will be rocked upwardly (see Figure 6) so causing the thickened end 29 of the lever arm 27 to enter the sleeve 28. The bevelled edge 42 of the part 29 then bears against the inner face of the part 28 and thereby imparts lateral movement to the shaft 36, this continuing until the whole of the thickened part 29 is within the sleeve and in this position the shaft is moved sufficiently to cause the disassociation of the clutch parts 37, 38 so disconnecting the drive from the cutter. The position of the parts in this position is indicated in dotted lines in Figure 3.

It will be understood that the usual clutch lever for operating the clutch parts 37, 38 will be provided and will act on the clutch in the usual manner independently of the device described.

The lever 25 could be arranged so that when it was moved to the position to insert the stop 23 in the path of the coupling arm 4 it would act directly on the shaft 36 to disconnect the clutch member 37 from the co-operating member 38 independently of the subsequent movement of the lifting levers 14, 15. In this case, of course, the movement of lever 25 in the opposite direction to remove the stop 23 from the path of the arm 4 would effect the reengagement of the clutch parts 37, 38 as will be understood.

It is the intention to cover herein all such changes and modifications of the illustrative form herein selected for purposes of the disclosure as do not depart from the spirit and scope of the invention which is defined in the following claims.

What is claimed is:

1. In a mower having a frame, a cutter bar including cutting mechanism, means including a clutch for driving the cutting mechanism, a rising and falling coupling arm connecting the cutter bar with the frame, means including a lift arm for raising and lowering the cutter bar, a stop to limit upward movement of said coupling arm, means to locate the stop in or out of the path of movement of the coupling arm, and means operable by the movement of said lift arm to disconnect the clutch to stop the cutting mechanism drive when the stop is in position to limit upward movement of the coupling arm.

2. In a mower having a frame, a cutter bar including cutting mechanism, means including a clutch for driving the cutting mechanism, a rising and falling coupling arm connecting the cutter bar with the frame, means including a lift arm for raising and lowering the cutter bar, a stop to limit upward movement of said coupling arm, means to locate the stop in or out of the path of movement of the coupling arm, and cam means connected to and operable by the movement of said lift arm to disconnect the clutch to stop the cutting mechanism drive when the stop is in position to limit upward movement of the coupling arm.

3. In a mower having a frame, a cutter bar including cutting mechanism, means including a clutch for driving the cutting mechanism, a rising and falling coupling arm connecting the cutter bar with the frame, means including a lift arm for raising and lowering the cutter bar, a stop to limit upward movement of said coupling arm, a lever connected to the stop to locate the said stop in or out of the path of movement of the coupling arm, a shifter for the clutch, and means connected to and operable by the movement of said lift arm to actuate the shifter for throwing out the clutch to stop the cutting mechanism drive when the stop is in position to limit the movement of the coupling arm.

4. In a mower having a frame, a cutter bar including cutting mechanism, means including a clutch for driving the cutting mechanism, a rising and falling coupling arm connecting the cutter bar with the frame, means including a lift arm for raising and lowering the cutter bar, a stop to limit upward movement of said coupling arm, means to locate the stop in or out of the path of movement of the coupling arm, and means acting automatically upon predetermined upward movement of the coupling arm to disconnect said clutch and stop the drive to the cutting mechanism.

5. In a mower having a frame, a cutter bar including cutting mechanism, means including a clutch for driving the cutting mechanism, a rising and falling coupling arm connecting the cutter bar with the frame, means including a lift arm for raising and lowering the cutter bar, a stop to limit upward movement of said coupling arm, means to locate the stop in or out of the path of movement of the coupling arm, and means controlled by the movement of the lift arm and the position of the stop to disengage the clutch.

In testimony whereof I affix my signature.

CHARLES PEARSON.